US007437146B2

United States Patent
Dudley et al.

(10) Patent No.: US 7,437,146 B2
(45) Date of Patent: Oct. 14, 2008

(54) SYSTEM AND METHOD FOR PROVIDING FEEDBACK TO WIRELESS DEVICE USERS

(75) Inventors: William H. Dudley, Lovettsville, VA (US); Robert C. Lovell, Jr., Leesburg, VA (US)

(73) Assignee: Sybase 365, Inc., Chantilly, VA (US)

( * ) Notice: Subject to any disclaimer, the term of this patent is extended or adjusted under 35 U.S.C. 154(b) by 7 days.

(21) Appl. No.: 11/730,069

(22) Filed: Mar. 29, 2007

(65) Prior Publication Data

US 2007/0239737 A1 Oct. 11, 2007

Related U.S. Application Data

(60) Provisional application No. 60/787,687, filed on Mar. 31, 2006.

(51) Int. Cl.
*H04M 3/16* (2006.01)
(52) U.S. Cl. ............... 455/412.2; 455/418; 455/414.1; 725/85; 709/203
(58) Field of Classification Search .............. 455/412.2, 455/418, 414.1; 725/85; 709/203
See application file for complete search history.

(56) References Cited

U.S. PATENT DOCUMENTS

| 2005/0276402 | A1* | 12/2005 | Tang et al. | 379/114.28 |
| 2006/0019685 | A1* | 1/2006 | Kornefalk | 455/466 |
| 2006/0153194 | A1* | 7/2006 | Kim | 370/392 |
| 2006/0168095 | A1* | 7/2006 | Sharma et al. | 709/217 |
| 2006/0218227 | A1* | 9/2006 | Spear | 709/203 |
| 2006/0272028 | A1* | 11/2006 | Maes | 726/27 |
| 2007/0005157 | A1* | 1/2007 | Tanimoto | 700/65 |
| 2007/0055999 | A1* | 3/2007 | Radom et al. | 725/86 |

* cited by examiner

*Primary Examiner*—Danh C Le
(74) *Attorney, Agent, or Firm*—Edell, Shapiro & Finnan LLC

(57) ABSTRACT

A user feedback generation and management capability, operating possibly within a Value-Added Service Provider, provides key feedback (e.g., information, updates, etc.) to a Mobile Subscriber (MS) during, for example, the MS' receipt of rich content on the MS' Wireless Device (WD). The feedback may be conveyed to a MS' WD through, possibly inter alia, one or more Short Message Service messages. Such feedback may, possibly inter alia, provide details as to why certain content might not be received, suggest one or more alternative content delivery means, etc. and thus serve to obviate what would otherwise be (1) a frustrating, disappointing, etc. user experience for the MS and (2) increased customer service costs for the different content and service providers.

20 Claims, 5 Drawing Sheets

SYSTEM AND METHOD FOR PROVIDING FEEDBACK TO WIRELESS DEVICE USERS

This application claims the benefit of U.S. Provisional Patent Application No. 60/787,687, filed on Mar. 31, 2006, which is herein incorporated by reference in its entirety.

BACKGROUND

1. Field of the Invention

The present invention relates generally to telecommunications services. More particularly, the present invention relates to capabilities that enhance substantially the value and usefulness of various wireless messaging paradigms (including, inter alia, Multimedia Message Service [MMS]) through the generation of, and the subsequent comprehensive management of, key user feedback.

2. Background of the Invention

As the 'wireless revolution' continues to march forward the ability of a Mobile Subscriber (MS), for example a user of a Wireless Device (WD) such as a mobile telephone, BlackBerry, etc. that is serviced by a Wireless Carrier (WC), to fully and completely utilize services such as MMS within a truly ubiquitous cross-carrier environment grows in importance while, simultaneously, the challenges that are associated with same similarly increase.

The present invention facilitates aspects of such utilization and addresses various of the challenges that are associated with same.

(The discussion below employs the specific wireless messaging paradigm MMS. However, it is to be understood that it would be readily apparent to one of ordinary skill in the relevant art that other messaging, etc. paradigms are easily possible and indeed are fully within the scope of the present invention.)

MMS has been deployed worldwide since 2000 primarily for Peer-to-Peer (P2P) messaging. However, MMS may also be used as a delivery mechanism for rich media content (including, inter alia, images, audio clips, video clips, text, ringtones, etc. or combinations of same) that may be directed to a user's WD under an Application-to-Peer (A2P) messaging model.

Users may request such rich content through a variety of methods including, inter alia, visiting a World Wide Web (WWW) site, visiting a mobile web site (e.g., a Wireless Application Protocol [WAP] site), sending a Short Message Service (SMS) message (to a Short Code [SC] or to a long code or to a Telephone Number [TN] or to etc.), calling a voice or Interactive Voice Response (IVR) enabled TN, etc. These methods, as well as others, may be used to initiate the sending of rich media content to a user's WD.

Reference is made to pending U.S. patent application Ser. No. 10/742,764, entitled "UNIVERSAL SHORT CODE ADMINISTRATION FACILITY," for a description of various of the advantages (e.g., abbreviated length, such as five digits for a SC administered by Neustar under the Common Short Code [CSC] program) and challenges (e.g., management, etc.) that are associated with SCs.

After it has been requested, rich media may be delivered to a WD through a number of different channels including, inter alia:

WAP Push. Under this model a mobile web Uniform Resource Locator (URL) is 'pushed' (i.e., sent) to the device using SMS delivery. The device user manually accesses the URL to download the content to the WD.

MMS. MMS content delivery is quite similar to P2P delivery in that the rich media is delivered to the device embedded in an MMS message. Using this method, the rich content may be presented in a wide variety of ways such as a mix of images, text, video clips, etc. For example, a user may subscribe to a news service that provides headlines and story summaries of the day's news. The presentation of this content might consist of "headline" text, a short summary with daily images and video clips, etc.—all formatted (as appropriate and as required) to fit the possibly smaller screen of a WD and all presented in a pleasing and easy layout (e.g., like a WWw page). This type of content delivery is not available using WAP push but is very well suited for MMS delivery.

For discrete content such as individual images, ringtones, audio clips or even videos, MMS is an attractive delivery vehicle. The media may be delivered as an attachment to the message or potentially embedded in the message. WDs may have the ability to save (and potentially process) any media embedded in an MMS message—for example, to save a ringtone that was delivered in the message.

One of the key elements of a MMS-based delivery scenario is the user's WD—i.e., e.g., it must support MMS. Many WDs support the ability to download ringtones, wall-papers, images, and other rich media, but do not have the ability to receive such content via MMS. Therefore, the originator of the content—e.g., a Content Provider (CP)—must preferably have the ability to qualify a user's device prior to completing a content transaction.

Unfortunately, the content delivery protocol for MMS—called MM7—does not have the ability to provide end-user device information. Consequently a CP, or any other similarly situated entity, is faced with a significant challenge. For example, a CP might maintain an extensive database of WD information in order to make the determination that a particular device will support MMS delivery. In order to obtain this data a CP must, among numerous other tasks, query each potential user as to their WD make and model as part of, for example, a registration, validation, etc. process. Such a repository would clearly be challenging to establish and difficult to keep current (with, e.g., an up-to-date list of WD capabilities from all device manufacturers). Consequently, the ability to maintain a comprehensive repository of user pre-qualification information is difficult at best.

In the worst case (and, indeed, in many cases) a user may select content to be sent to their WD, complete the transaction, wait for the content to be delivered to their device, but nothing arrives. A CP, or any other similarly situated entity, or the user's WC is then faced with a frustrated user and additional customer support costs.

Additionally, the user, having received no feedback, may be reluctant to utilize the CP or WC for any further transactions.

Thus there is a need for improved systems, methods and mechanisms that facilitate the passing of, e.g., MMS messages to an end user, and that provide a better overall experience to that end user.

SUMMARY OF THE INVENTION

The ability of a user to receive feedback that their WD is incapable of receiving, for example, rich media content is a key element of a successful, positive user experience. A feedback message may provide details as to why certain content will not be received and, possibly further, suggest one or more alternative means for message delivery, viewing, etc. Additionally, a feedback message may indicate that any financial transaction or billing is null and void as the content cannot be delivered.

In today's mobile ecosystem the most reliable method for providing feedback messages is through SMS (or text) messaging. In fact, one or more judiciously-dispatched SMS messages can work to alleviate a vast majority of the 'no feedback issues' that a user may encounter when trying to complete, for example, a content transaction.

Furthermore, once content has been delivered to a user's WD one or more SMS messages may be dispatched indicating that the transaction has been completed with, for example, additional information regarding further options or other suggestions.

The central point is clear—through the timely dispatch of feedback messages an end user is kept informed of, for example, transaction status, etc.

One embodiment of the present invention provides a method of providing for feedback to a mobile subscriber indicating a status of delivery of content to the mobile subscriber that includes receiving, at a value added service provider (VASP), a request to deliver content from a content provider that is intended for a subscriber of a mobile operator; determining, at the VASP, routing information sufficient to pass the request to deliver content to a multimedia message service center (MMSC) that serves the subscriber; passing a submit request message to the MMSC to deliver the content to the MMSC; receiving from the MMSC a response message including a failure code indicating that the content is not receivable by the subscriber; and in response to the response message from the MMSC, generating an SMS notification message that is passed to a short message service center that serves the subscriber, the SMS notification message indicating to the subscriber that delivery of the content failed.

This embodiment preferably also includes validating the content provider and/or validating syntax employed by the request to deliver content.

In a preferred embodiment, the request to deliver content is an MM7_Submit.REQ message.

Further, in one possible embodiment, the SMS notification message includes information other than an indication that the delivery of the content failed, where the information may be selected statically, randomly, and/or based on a location of the subscriber. The information may include an advertisement.

In another embodiment, there is provided a method of providing for feedback to a mobile subscriber indicating a status of delivery of multimedia content to the mobile subscriber, wherein the method includes receiving, at a value added service provider (VASP), an MM7_Submit.REQ message from a content provider that is intended for a multimedia message service center (MMSC) that serves the subscriber; determining, at the VASP, routing information sufficient to pass or reformulate and send the MM7_Submit.REQ message to the MMSC that serves the subscriber; receiving from the MMSC that serves the subscriber an MM7_Delivery.REQ message indicating an expired or rejected MM1_Notification.REQ message sent by the MMSC that serves the subscriber to the subscriber; and in response to the received MM7_Delivery.REQ message indicating an expired or rejected MM1_Notification.REQ message, generating a short message service (SMS) notification message and sending the same to the short message service center (SMSC) that serves the subscriber, the SMS notification message indicating to the subscriber that delivery of content failed.

This embodiment preferably further includes sending an MM7_Delivery.REQ message indicating an expired or rejected MM1_Notification.REQ message to the content provider, validating the content provider and/or validating syntax.

As in the former embodiment, in the instant embodiment the SMS notification message includes information other than an indication that the delivery of the content failed.

In still another embodiment, there is provided a method of providing for feedback to a mobile subscriber indicating a status of delivery of multimedia content to the mobile subscriber, including receiving, at a value added service provider (VASP), an MM7_Submit.REQ message from a content provider that is intended for a multimedia message service center (MMSC) that serves the subscriber; determining, at the VASP, routing information sufficient to pass or reformulate and send the MM7_Submit.REQ message to the MMSC that serves the subscriber; receiving, at the VASP, from the MMSC that serves the subscriber an MM7_Delivery_Report.REQ indicating successful delivery of content to the subscriber; and in response to the received MM7_Delivery.Report.REQ message indicating successful delivery, generating a short message service (SMS) notification message and sending the same to the short message service center (SMSC) that serves the subscriber, the SMS notification message indicating to the subscriber that delivery of content was successful.

In this latest embodiment, or in the others, the method includes generating a billing event associated with the SMS notification and sending an MM7_Delivery_Report.REQ message to the content provider. The method may further provide that the SMS notification message includes information other than an indication that the delivery of the content was successful, and that the information is selected based on a location of the subscriber.

These and other features of the embodiments of the present invention along with their attendant advantages will be more fully appreciated upon a reading of the following detailed description in conjunction with the associated drawings.

DETAILED DESCRIPTION OF THE INVENTION

The timely dispatch of feedback messages to WD users, as provided for through aspects of the present invention, utilizes both the MMS infrastructure and the SMS infrastructure of a VASP, leverages the core capabilities of a recipient WC's Multimedia Message Service Center (MMSC), and integrates the dynamic, flexible interpretation of the standard result codes that are returned to a VASP on behalf of a WC. However, this method does not require end-user WD knowledge as in a strictly standards-based MM7 based MMS ecosystem this information is not returned to a CP, or in the instant model, the VASP.

Figure 5:
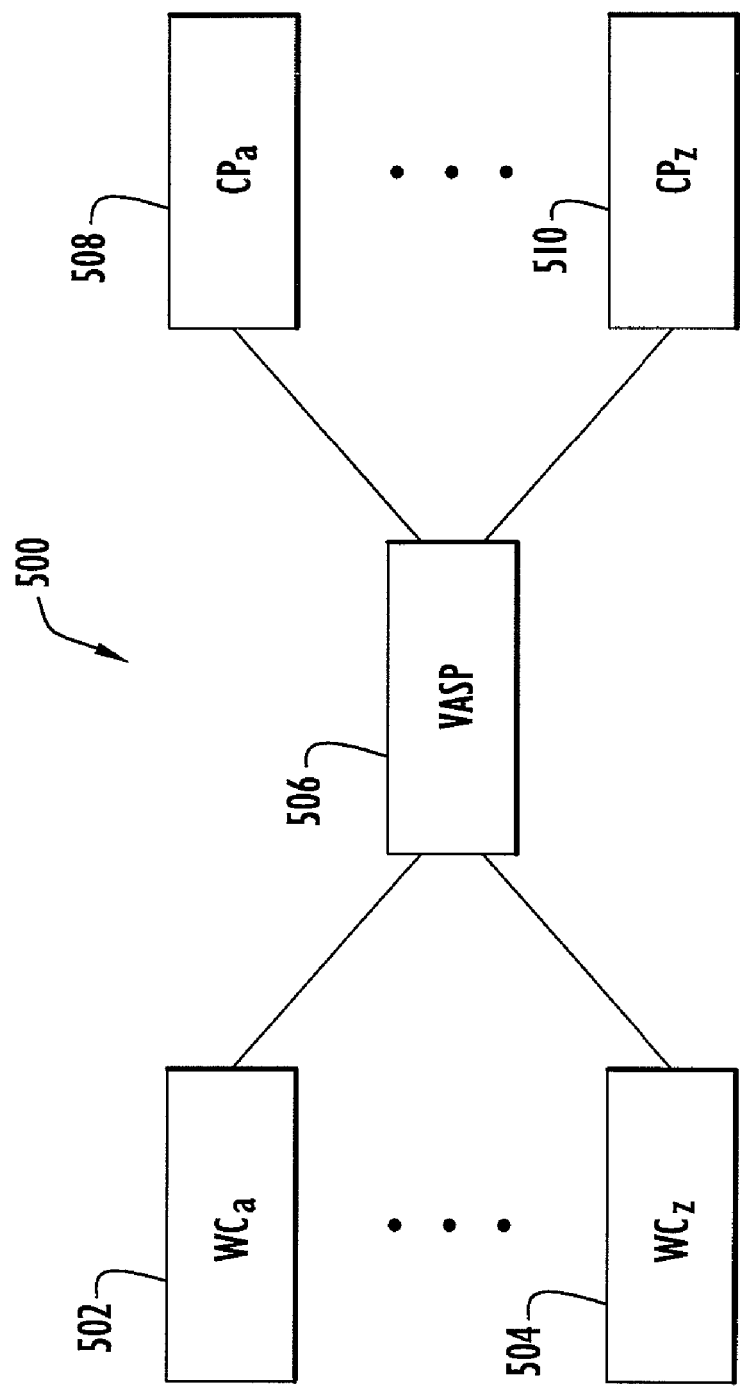
FIG. 5 illustrates the relative locations of a Value-Added Service Provider (VASP), WCs, and CPs in accordance with embodiments of the instant invention.

As illustrated in FIG. 5 a VASP exists as a separate entity from, possibly inter alia, WCs. As such a VASP is able to provide a number of value-added services, capabilities, etc. that enable WCs to, among other things and for the context of the present invention, deliver rich media content from sources outside of a WC's domain and control.

Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a description of a VASP, a summary of various of the services/functions/etc. that are performed by a VASP, and a discussion of the numerous advantages that arise from same. U.S. Pat. No. 7,154,901 is incorporated herein by reference.

In brief, a VASP may be disposed between, possibly inter alia, multiple WCs ($WC_a$ 502→$WC_z$ 504 in FIG. 5) on one side and multiple CPs ($CP_a$ 508→$CP_z$ 510) on the other side thus 'bridging' all of the connected entities. A VASP thus, as one simple example, may offer various routing, formatting, delivery, value-add, etc. capabilities that provide, possibly inter alia:

1) A WC (and, by extension, all of the mobile subscribers that are serviced by the WC) with ubiquitous access to a broad universe of CPs, and 2) A CP with ubiquitous access to a broad universe of WCs (and, by extension, to all of the mobile subscribers that are serviced by the WCs).

To help illustrate aspects of the present invention consider the following hypothetical example. As part of a content transaction a brief MMS message exchange is completed between a CP, a VASP, and the recipient WC. This exchange is invisible to the end user. Following the exchange a user may receive feedback on their WD through one of several means, including inter alia:

a) an MMS message with the requested content b) an SMS message indicating the requested content cannot be delivered via direct MMS to their WD.

The end user may also receive one or more additional feedback messages indicating that they may 'view' the MMS message on their WC's legacy control system.

The exchange that was described above (1) employs the standards-based MM7 protocol (see, for example, Version 5.4 of the 3$^{rd}$ Generation Partnership Project [3GPP] Technical Specification [TS] 23.140) message operations and (2) leverages the capabilities of a VASP (serving as an intermediary between multiple CPs and a plurality of WCs).

The MM7 MM7_submit.REQ operation may be executed by a CP to request the delivery of an MMS message to a MS. Upon receiving an MM7_submit.REQ message from the CP a VASP may respond synchronously with an MM7_submit.RES message indicating success or failure. A successful MM7_submit.RES does not indicate delivery of a message to a WC, but merely acceptance of the message for subsequent delivery. The VASP may enforce, for example, an authentication policy on all MM7_submit.REQ messages to, possibly inter alia, reduce unsolicited messages being sent to a WC. The VASP may then forward the message to the recipient WC.

FIGS. 1, 2, 3, and 4 (which are discussed below) illustrate aspects of the message flow that was just presented. In the discussion below reference is made to messages that are sent, for example, between a CP 102/202/302/402 and a MS' WD 112/212/312/412. As set forth below, a given 'message' sent between a CP 102/202/302/402 and a MS' WD 112/212/312/412 may actually comprise a series of steps in which the message is received, forwarded and routed between different entities, including possibly inter alia a CP 102/202/302/402, a VASP 104/204/304/404, a WC's MMSC 108/208/308/408, and a MS' WD 112/212/312/412. Thus, unless otherwise indicated, it will be understood that reference to a particular message generally includes that particular message as conveyed at any stage between an origination source, such as for example a CP 102/202/302/402, and an end receiver, such as for example a MS' WD 112/212/312/412. As such, reference to a particular message generally includes a series of related communications between, for example, a CP 102/202/302/402 and a VASP 104/204/304/404; a VASP 104/204/304/404 and a MMSC 108/208/308/408; etc. The series of related communications may, in general, contain substantially the same information, or information may be added or subtracted in different communications that nevertheless may be generally referred to as a same message. To aid in clarity, a particular message, whether undergoing changes or not, is referred to by different reference numbers at different stages between a source and an endpoint of the message.

Once a recipient MMSC 108/208/308/408 (in FIGS. 1, 2, 3, and 4) receives an MMS message (and its associated content) 118/218/318/418 it may return an MM7_submit.RES message 120/220/320/420 indicating the initial success or failure of the message (but not necessarily ultimate end user success or failure). For example, FIG. 2 provides an illustrative message flow where the MM7_submit.RES 220 message returns a status code that may be used to trigger 224 a particular SMS feedback message 226. The table below shows the possible MM7 status codes as defined under Section 8.7.8.3.1 of Version 5.4 of the 3GPP TS 23.140:

| StatusCode | StatusText | Meaning |
| --- | --- | --- |
| 1000 | Success | This code indicates that the request was executed completely |
| 1100 | Partial success | This code indicates that the request was executed partially but some parts of the request could not be completed. Lower order digits and the optional Details element may indicate what parts of the request were not completed. |
| 2000 | Client error | Client made an invalid request |
| 2001 | Operation restricted | The request was refused due to lack of permission to execute the command. |
| 2002 | Address Error | The address supplied in the request was not in a recognized format or the MMS Relay/Server ascertained that the address was not valid for the network because it was determined not to be serviced by this MMS Relay/Server. When used in response-result, and multiple recipients were |

-continued

| StatusCode | StatusText | Meaning |
|---|---|---|
| | | specified in the corresponding push submission, this status code indicates that at least one address is incorrect. |
| 2003 | Address Not Found | The address supplied in the request could not be located by the MMS Relay/Server. This code is returned when an operation is requested on a previously submitted message and the MMS Relay/Server cannot find the message for the address specified. |
| 2004 | Multimedia content refused | The server could not parse the MIME content that was attached to the SOAP message and indicated by the Content element or the content size or media type was unacceptable. |
| 2005 | Message ID Not found | This code is returned when an operation is requested on a previously submitted message and the MMS Relay/Server cannot find the message for the message ID specified or when the VASP receives a report concerning a previously submitted message and the message ID is not recognized. |
| 2006 | LinkedID not found | This code is returned when a LinkedID was supplied and the MMS Relay/Server could not find the related message. |
| 2007 | Message format corrupt | An element value format is inappropriate or incorrect. |
| 3000 | Server Error | The server failed to fulfill an apparently valid request. |
| 3001 | Not Possible | The request could not be carried out because it is not possible. This code is normally used as a result of a cancel or status query on a message that is no longer available for cancel or status query. The MMS Relay/Server has recognized the message in question, but it cannot fulfill the request because the message is already complete or status is no longer available. |
| 3002 | Message rejected | Server could not complete the service requested. |
| 3003 | Multiple addresses not supported | The MMS Relay/Server does not support this operation on multiple recipients. The operation MAY be resubmitted as multiple single recipient operations. |
| 4000 | General service error | The requested service cannot be fulfilled. |
| 4001 | Improper identification | Identification header of the request does not uniquely identify the client (either the VASP or MMS Relay/Server). |
| 4002 | Unsupported version | The version indicated by the MM7 Version element is not supported. |
| 4003 | Unsupported operation | The server does not support the request indicated by the MessageType element in the header of the message. |
| 4004 | Validation error | The SOAP and XML structures could not be parsed, mandatory fields are missing, or the message-format is not compatible to the format specified. Details field may specify the parsing error that caused this status. |
| 4005 | Service error | The operation caused a server (either MMS Relay/Server or VASP) failure and should not be resent. |
| 4006 | Service unavailable | This indication may be sent by the server when service is temporarily unavailable, e.g. when server is busy |
| 4007 | Service denied | The client does not have permission or funds to perform the requested operation. |

A single status code or a flexible, extensible, and dynamically configurable set of status codes may be used to trigger a SMS feedback message. For example, a SMS feedback message may be dispatched following the identification of one or more status codes indicating an error condition.

Different WC MMSCs may implement status code responses differently (e.g., in ways that deviate from the various standards documents). Consequently within a VASP an intermediate mapping or translation layer may be employed through which possibly WC-specific, MMSC vendor-specific, etc. status codes may be passed for purposes of intra-VASP normalization or standardization.

The eventual success or failure of message delivery to the recipient WC's MMSC may be reported back to a VASP asynchronously through an MM7_delivery.* operation. In order to support this operation, a VASP and the recipient WC may support the MM7_delivery.REQ and MM7_delivery.RES operations.

Figure 1:
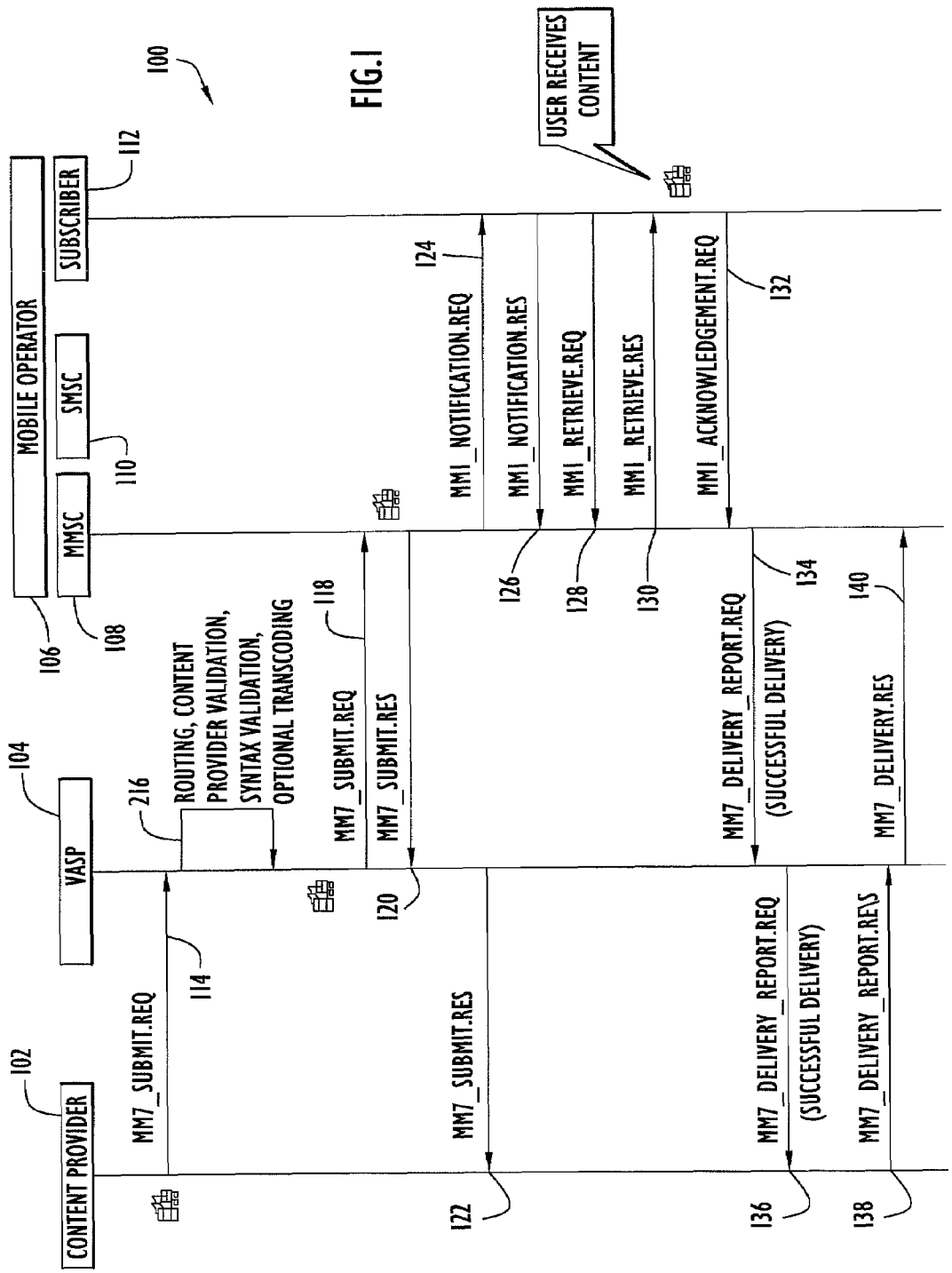
FIG. 1 illustrates various of the exchanges or interactions that are possible during the successful delivery of content to a (MMS-capable) MS WD.
Figure 2:
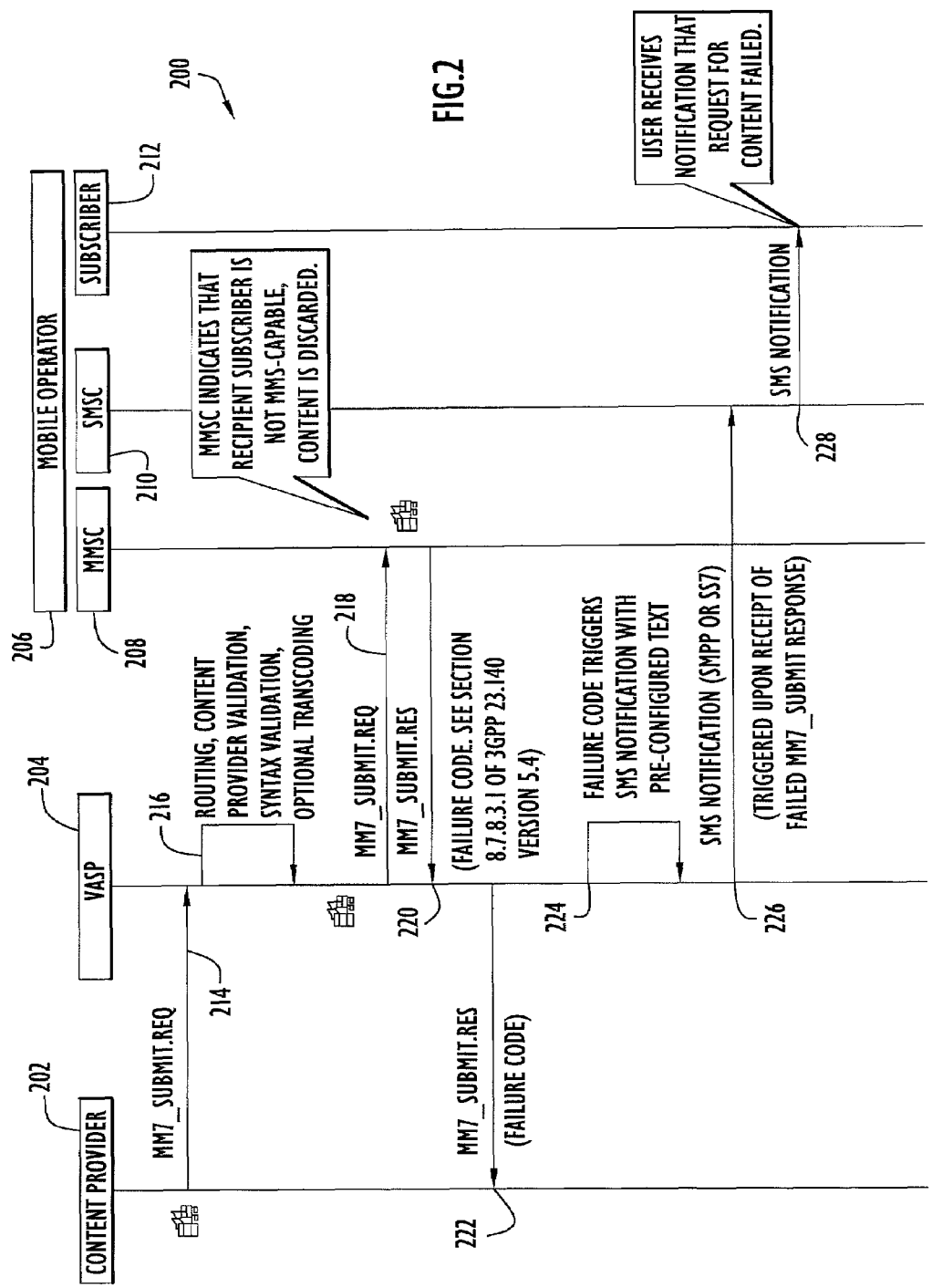
FIG. 2 illustrates various of the exchanges or interactions that are possible during the unsuccessful delivery of content to a (non-MMS capable) MS WD.
Figure 3:
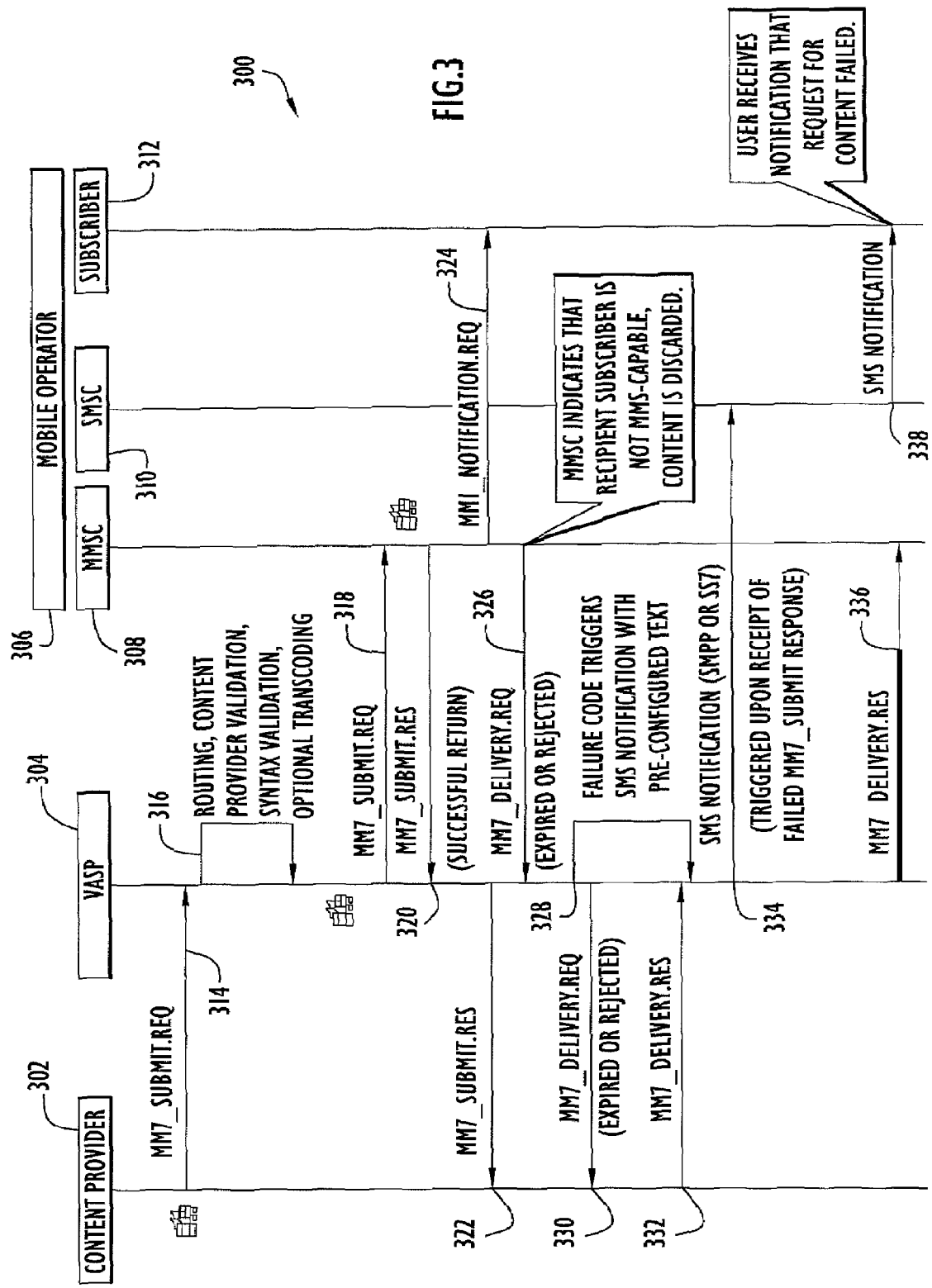
FIG. 3 illustrates further exchanges or interactions that are possible during the unsuccessful delivery of content to a (non-MMS capable) MS WD.
Figure 4:
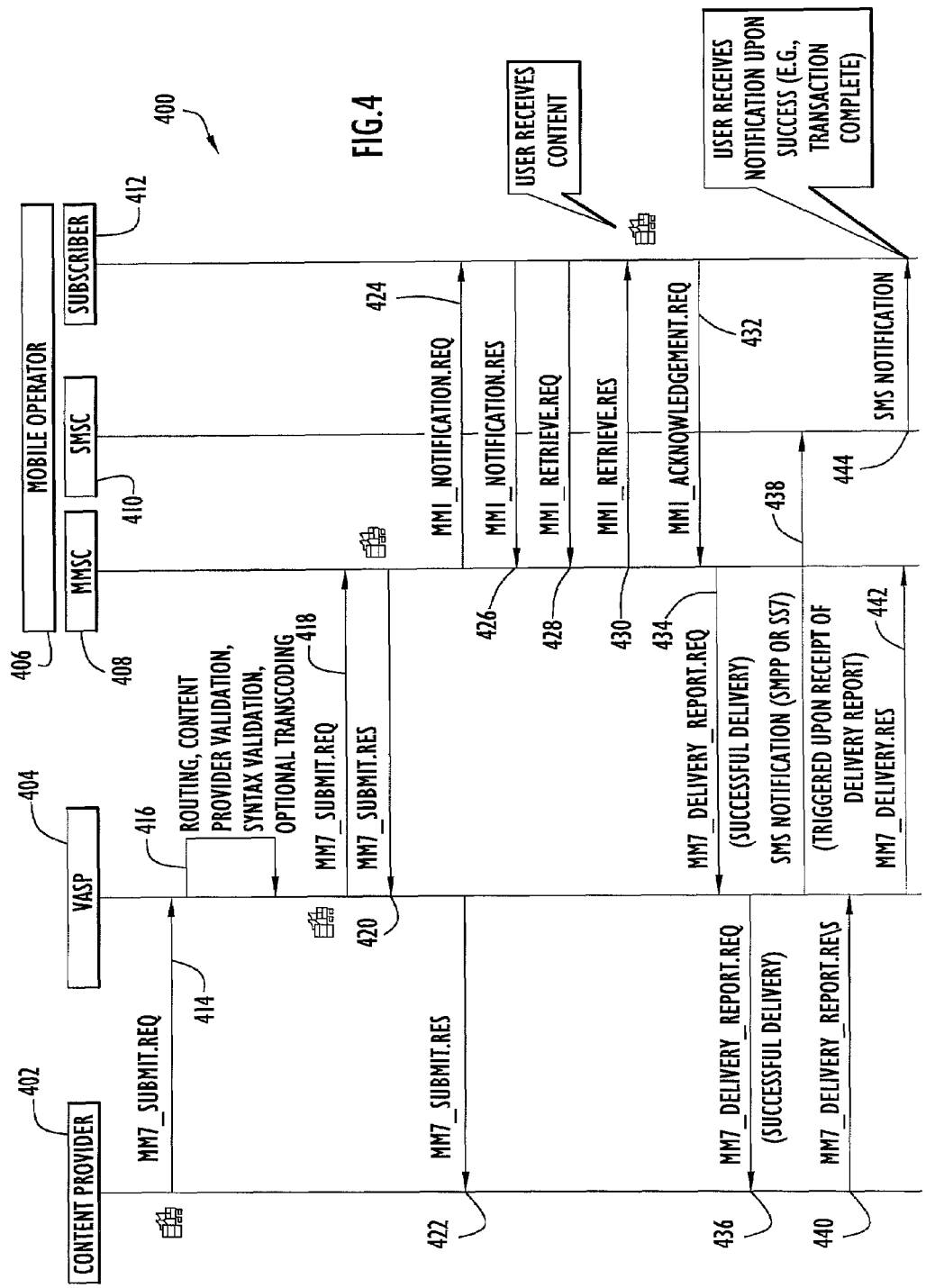
FIG. 4 illustrates alternative exchanges or interactions that are possible during the successful delivery of content to a (MMS-capable) MS WD.

Illustrative uses of this operation within aspects of the present invention are presented in FIG. 1 (a normal operation with no triggered SMS feedback message), FIG. 3 (an SMS feedback message 334 triggered 328 upon the receipt of an indication of a rejected, expired, or possibly indeterminate MM Status), and FIG. 4 (an SMS feedback message 438 triggered upon the receipt of an MM Status indicator). The specific exchanges that were just described are illustrative only and it will be readily apparent to one of ordinary skill in the relevant art that numerous other exchanges are easily possible and indeed are fully within the scope of the present invention.

As illustrated in FIGS. 2, 3, and 4 an SMS feedback message 226/334/438 (in FIGS. 2, 3, and 4) is internally routed within a VASP's infrastructure 204/304/404 to be delivered through its normal SMS links to a WC's SMSC 210/310/410 for display on the recipient end user's WD 212/313/412.

FIGS. 1-4 are explained in more detail below. The numbered elements in these figures are sometimes referred to as "steps" or "messages," and those skilled in the art will appreciate that this nomenclature is interchangeable.

In the sequence diagram 100, content provider 102 sends an MM7_Submit.REQ message 114 to VASP 104, whereupon several validation and routing steps are preferably performed at step 116. In particular, step 116 may include routing, content validation, syntax validation and/or transcoding services that enable any one of a plurality of content providers to pass messages to different mobile operators and their respective subscribers. For instance, routing information may be determined by the VASP sufficient to pass content to a multimedia message service center (MMSC) that serves the subscriber 112.

VASP 104, then sends an MM7_Submit.REQ message 118 to the mobile operator 106's MMSC 108, which replies with an MM7_Submit.RES 120. VASP 104 passes this message or a newly formulated MM7_Submit.RES message 122 back to content provider 102.

In the meantime, MMSC 108 exchanges several messages with subscriber 112, including MM1_Notification.REQ 124, MM1_Notification.RES 126, MM1_Retrieve.REQ 128 and MM1_Retrieve.RES 130, and MM1_Acknowledgement.REQ, all used to, in essence, request and receive the MMS content. MMSC 108, then sends an MM7_Delivery_Report.REQ "Successful delivery" message 134 to VASP 104, which sends a corresponding message 136 to content provider 102. Content provider 102 then responds with an MM7_Delivery_Report.RES 138 that is passed as message 140 to MMSC 108.

FIG. 2 depicts the scenario where the intended recipient is unable to receive the MMS-capable content. As shown in sequence diagram 200, content provider 202 sends an MM7_Submit.REQ message 214 to VASP 204, where routing and validation steps 216 are performed. VASP 204 then sends MM7_Submit.REQ 218 to MMSC 208 of mobile operator 206, and a failure code is returned with MM7_Submit.RES message 220. The failure code is passed back to content provider 202 in message 222. Meanwhile, at step 224, the failure code triggers a process 224 within VASP 204 that initiates an SMS message to be sent to the SMSC 210 of the mobile operator 206, at step 226. That SMS message is then passed to subscriber 212 at step 228.

FIG. 3 depicts sequence 300, wherein content provider 302 sends an MM7_Submit.REQ message 314 to VASP 304, where routing and validation steps 316 are performed. VASP 304 then sends MM7_Submit.REQ 318 to MMSC 308 of mobile operator 306, which returns an MM7_Submit.RES "successful return" message at step 320.

MMSC 308 then sends an MM1_Notification.REQ message 324 to subscriber 312. Not receiving any reply, MMSC 308 sends an MM7_Delivery.REQ expired or rejected message 326 to VASP 304. This message is passed to content provider 302 via message exchange 330 and 332. Meanwhile, a failure code triggers an SMS notification message at step 328, which message is sent at step 334 to SMSC 310 the SMS notification message is delivered to the subscriber at step 338. Also, as shown, an MM7_Delivery.RES is delivered to MMSC 308 at step 336.

FIG. 4 depicts sequence 400 in which content provider 402 sends an MM7_Submit.REQ message 414 to VASP 404, whereupon several validation and routing steps are preferably performed as shown by reference numeral 416. VASP 404 then sends an MM7_Submit.REQ message 418 to the mobile operator 406's MMSC 408, which replies with an MM7_Submit.RES 420. VASP 404 passes this message or a newly formulated MM7_Submit.RES message 422 back to content provider 402.

In the meantime, MMSC 408 exchanges several messages with subscriber 412, including MM1_Notification.REQ 424, MM1_Notification.RES 426, MM1_Retrieve.REQ 428, MM1_Retrieve.RES 430, and MM1_Acknowledgement.REQ 432, all used to, in essence, request and receive the MMS content. MMSC 108, then sends an MM7_Delivery Report.REQ "Successful delivery" message 434 to VASP 404, which sends a corresponding message 436 to content provider 402. Content provider 402, in turn, responds with an MM7_Delivery_Report.RES 440, whereupon a corresponding message 442 is sent to MMSC 408.

Around the same time as steps 434 and 436, VASP 404 issues an SMS Notification message 438 to SMSC 410 that is triggered based on the receipt of the delivery report received at step 434. Notification message 438 is passed as SMS Notification 444 to subscriber 412.

The specific message exchanges that were described above are illustrative only and it will be readily apparent to one of ordinary skill in the relevant art that numerous other exchanges are easily possible and indeed are fully within the scope of the present invention.

The discussion that was just presented employed SMS for the delivery of feedback messages. However, it is to be understood that it would be readily apparent to one of ordinary skill in the relevant art that other paradigms (e.g., e-mail, etc.) are easily possible and indeed are fully within the scope of the present invention.

The body of a feedback message may be configurable based on, as an example of some of the many possibilities, logic within a VASP, guidance from a WC and/or CP, etc.

The body of a feedback message may be specifically configured via a profile for each defined status code with different information, etc. available for each defined status code. For example, a feedback message may provide different guidance to the end user based on a specific code returned (e.g., any error status code, either in a MM7_submit.RES message or in a MM7_delivery_report.RES message).

The feedback messages that were described above may optionally contain an informational element—e.g., 'Thank you for using our service!', etc. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current physical location of the recipient of the message as derived from, as one example, a Location-Based Service [LBS] facility).

Feedback messages may optionally contain advertising—e.g., textual material if an SMS model is being utilized, or multimedia (images of brand logos, sound, video snippets, etc.) material if another (suitably capable) model is being utilized. The advertising material may be selected statically (e.g., all generated messages are injected with the same advertising material), randomly (e.g., a generated message is injected with advertising material that is randomly selected from a pool of available material), or location-based (i.e., a generated message is injected with advertising material that is selected from a pool of available material based on the current physical location of the recipient of the message as derived from, as one example, a LBS facility).

Feedback messages may optionally contain promotional materials (e.g., static text, still images, video clips, etc.).

Within a VASP a repository may be populated with the particulars of (e.g., detail records for) all of the MMS, SMS, etc. messages that transit the VASP. Among other things, such a repository may be used to support scheduled (e.g., daily, weekly, etc.) and/or on-demand reporting with report results delivered (to, for example, an end user) through SMS, MMS, etc. messages; through e-mail; through a Web-based facility; etc.

Within a VASP the process through which feedback messages are generated and dispatched may include a billing component. A billing component may include one or more billing transactions, each of which may take any number of forms and may involve different external entities (e.g., a WC's billing system, a carrier billing system service bureau, a credit or debit card clearinghouse, etc.). A billing transaction may include, inter alia:

1) The appearance of a line item charge on the bill or statement that an end user receives from her WC. Exemplary mechanics and logistics associated with this approach are described in pending U.S. patent application Ser. No. 10/837, 695 entitled "SYSTEM AND METHOD FOR BILLING AUGMENTATION," which is incorporated herein by reference. Other ways of completing or performing line item billing are easily implemented by those skilled in the art.

2) The charging of a credit card or the debiting of a debit card.

It is important to note that while aspects of the discussion that was presented above focused on the use of SCs, it will be readily apparent to one of ordinary skill in the relevant art that TNs and other message address identifiers are equally applicable and, indeed, are fully within the scope of the present invention.

The discussion that was just presented employed the specific wireless messaging paradigm MMS. This paradigm potentially offer an incremental advantage over other paradigms in that native support for MMS is commonly found on the mobile telephone that a potential SU would be carrying. However, it is to be understood that it would be readily apparent to one of ordinary skill in the relevant art that other paradigms are fully within the scope of the present invention.

It is important to note that the hypothetical example that was presented above, which was described in the narrative and which was illustrated in the accompanying figures, is exemplary only. It will be readily apparent to one of ordinary skill in the relevant art that numerous alternatives to the presented example are easily possible and, indeed, are fully within the scope of the present invention.

The following list defines acronyms as used in this disclosure.

| Acronym | Meaning |
| --- | --- |
| A2P | Application-to-Peer |
| CP | Content Provider |
| CSC | Common Short Code |

-continued

| Acronym | Meaning |
| --- | --- |
| IVR | Interactive Voice Response |
| LBS | Location-Based Service |
| MMS | Multimedia Message Service |
| MMSC | Multimedia Message Service Center |
| MS | Mobile Subscriber |
| P2P | Peer-to-Peer |
| SC | Short Code |
| SMS | Short Message Service |
| 3GPP | Third Generation Partnership Project |
| TN | Telephone Number |
| TS | Technical Specification |
| URL | Uniform Resource Locator |
| VASP | Value-Added Service Provider |
| WAP | Wireless Application Protocol |
| WC | Wireless Carrier |
| WD | Wireless Device |
| WWW | World Wide Web |

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the relevant art in light of the above disclosure.

What is claimed is:

1. A method of providing for feedback to a mobile subscriber indicating a status of delivery of content to the mobile subscriber, the method comprising the steps of:
receiving, at a value added service provider (VASP), a request to deliver content from a content provider that is intended for a subscriber of a mobile operator;
determining, at the VASP, routing information sufficient to pass the request to deliver content to a multimedia message service center (MMSC) that serves the subscriber;
passing a submit request message to the MMSC to deliver the content to the MMSC;
receiving from the MMSC a response message including a failure code indicating that the content is not receivable by the subscriber; and
in response to the response message from the MMSC, generating an SMS notification message that is passed to a short message service center that serves the subscriber, the SMS notification message indicating to the subscriber that delivery of the content failed.

2. The method of claim 1, further comprising validating the content provider.

3. The method of claim 1, further comprising validating syntax employed by the request to deliver content.

4. The method of claim 1, wherein the request to deliver content is an MM7_Submit.REQ message.

5. The method of claim 1, wherein the SMS notification message includes information other than an indication that the delivery of the content failed.

6. The method of claim 5, wherein the information is selected statically.

7. The method of claim 5, wherein the information is selected randomly.

8. The method of claim 5, wherein the information is selected based on a location of the subscriber.

9. The method of claim 5, wherein the information comprises an advertisement.

10. A method of providing for feedback to a mobile subscriber indicating a status of delivery of multimedia content to the mobile subscriber, the method comprising the steps of:

receiving, at a value added service provider (VASP), an MM7_Submit.REQ message from a content provider that is intended for a multimedia message service center (MMSC) that serves the subscriber;

determining, at the VASP, routing information sufficient to pass or reformulate and send the MM7_Submit.REQ message to the MMSC that serves the subscriber;

receiving from the MMSC that serves the subscriber an MM7_Delivery.REQ message indicating an expired or rejected MM1_Notification.REQ message sent by the MMSC that serves the subscriber to the subscriber; and in response to the received MM7_Delivery.REQ message indicating an expired or rejected MM1_Notification.REQ message, generating a short message service (SMS) notification message and sending the same to the short message service center (SMSC) that serves the subscriber, the SMS notification message indicating to the subscriber that delivery of content failed.

11. The method of claim 10, further comprising sending an MM7_Delivery.REQ message indicating an expired or rejected MM1_Notification.REQ message to the content provider.

12. The method of claim 10, further comprising validating the content provider.

13. The method of claim 10, further comprising validating syntax.

14. The method of claim 10, wherein the SMS notification message includes information other than an indication that the delivery of the content failed.

15. A method of providing for feedback to a mobile subscriber indicating a status of delivery of multimedia content to the mobile subscriber, the method comprising the steps of:

receiving, at a value added service provider (VASP), an MM7_Submit.REQ message from a content provider that is intended for a multimedia message service center (MMSC) that serves the subscriber;

determining, at the VASP, routing information sufficient to pass or reformulate and send the MM7_Submit.REQ message to the MMSC that serves the subscriber;

receiving, at the VASP, from the MMSC that serves the subscriber an MM7_Delivery_Report.REQ indicating successful delivery of content to the subscriber; and in response to the received MM7_Delivery.Report.REQ message indicating successful delivery, generating a short message service (SMS) notification message and sending the same to the short message service center (SMSC) that serves the subscriber, the SMS notification message indicating to the subscriber that delivery of content was successful.

16. The method of claim 15, further comprising generating a billing event associated with the SMS notification.

17. The method of claim 15, further comprising sending an MM7_Delivery_Report.REQ message to the content provider.

18. The method of claim 15, wherein the SMS notification message includes information other than an indication that the delivery of the content was successful.

19. The method of claim 18, wherein the information is selected based on a location of the subscriber.

20. The method of claim 18, wherein the information comprises an advertisement.

* * * * *

UNITED STATES PATENT AND TRADEMARK OFFICE
CERTIFICATE OF CORRECTION

PATENT NO. : 7,437,146 B2 Page 1 of 1
APPLICATION NO. : 11/730069
DATED : October 14, 2008
INVENTOR(S) : William H. Dudley et al.

It is certified that error appears in the above-identified patent and that said Letters Patent is hereby corrected as shown below:

| | |
|---|---|
| Figure 1: | "Step 216" should read --Step 116-- |
| Figure 1, Step 138: | "MM7_DELIVERY_REPORT.RE\S" should read --MM7_DELIVERY_REPORT.RES-- |
| Figure 4 Step 440: | "MM7_DELIVERY_REPORT_RE\S" should read --MM7_DELIVERY_REPORT.RES-- |
| Col. 2, lines 9-10: | "WWw page" should read --WWW-- |
| Col. 10, line 1: | "to SMSC 310 the SMS" should read --to SMSC 310. The SMS-- |
| Col. 10, line 19: | "MMSC 108" should read --MMSC 408-- |

Signed and Sealed this

Twenty-fourth Day of February, 2009

JOHN DOLL
*Acting Director of the United States Patent and Trademark Office*